May 14, 1957     P. D. CORNELIUS     2,791,914
SPRING PLUNGER
Filed July 13, 1953
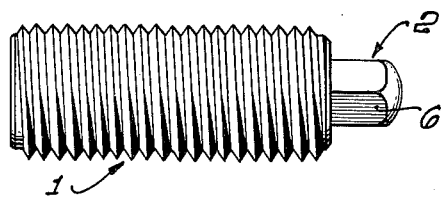
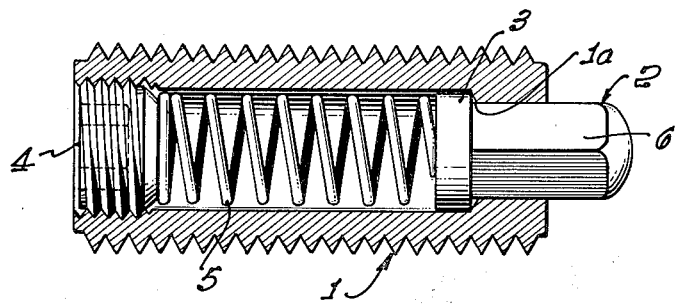
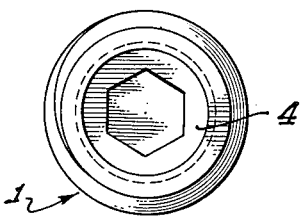     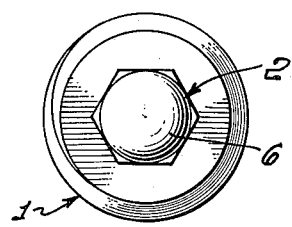
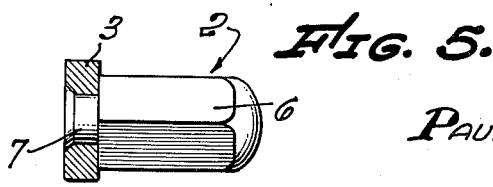
PAUL D. CORNELIUS,
INVENTOR.
BY *O O Martin*
ATTORNEY.

United States Patent Office 2,791,914
Patented May 14, 1957

2,791,914

SPRING PLUNGER

Paul D. Cornelius, Los Angeles, Calif., assignor to Vlier Engineering Inc., Los Angeles, Calif., a corporation of California Application July 13, 1953, Serial No. 367,695

5 Claims. (Cl. 74—527)

This invention relates to a spring controlled locating device primarily for use in jigs, fixtures and dies but applicable as well to other tools or machines where such spring controlled locating is required.

A device of this character must necessarily be extremely compact in order that it may fit into the very limited spaces within such tools, and it is at the same time essential that the spring pressure remains as nearly as possible uniform throughout the length of adjustment.

The object of my invention is to provide a locating device for jigs, fixtures and the like of simple and inexpensive construction and which is convenient to operate. A further object is to provide a device so constructed that the plunger movement thereof is very long relative to the length of the body thereof.

With these objects in view, the invention resides in the combinations hereinafter fully described and illustrated in the accompanying drawing of which:

Fig. 1 is a side view of the device of the invention;

Fig. 2 is a cross-sectional view through the axial center thereof;

Figs. 3 and 4 are end views of the device; and

Fig. 5 illustrates a part of the device as it appears when removed therefrom.

The structure of the invention comprises a tubular body 1, which is provided with external screw threads throughout its length. A plunger 2 is seated in this body for limited axial movement therein. The plunger is shown made with a head 3 for engagement with an internal shoulder 1ª of the body. The latter is, at the opposite end, provided with internal screwthreads for receiving therein a screw plug 4.

The plunger 2 is first seated within the body 1 into which a spring 5 then is inserted, whereupon the plug 4 is mounted in the screwthreads of the body. The spring maintains the plunger advanced against the shoulder 1ª of the body, in which position the reduced portion 6 of the plunger projects a distance beyond the end of the device.

The shape and construction of the plunger are important for the following reasons. It is necessary to provide as much space as possible for the spring in order to obtain substantially even tension thereon during the operation of the device and the head 3 of the plunger is to this end made quite thin. The reduced portion 6 of the plunger is polygonal in cross-section, having preferably six sides. When so constructed and when the plunger is of a size slidably to fit within a similar polygonal passage through the end of the body, it is seen that a wrench may be applied to the projecting portion of the plunger to impart rotation to the device as required in order to mount the device in screwthreads of the tool which it is designed to serve. It would, however, be a rather expensive operation to mill the flat sides on the plunger and it is, for this reason, found preferable to make the plunger in the manner best shown in Fig. 5. Polygonal stock of the required size is fed into a screw machine chuck and turned down to produce the reduced shoulder portion 7. The head 3 is also made on a screw machine, out of stock of the proper diameter, whereupon it is pressed onto this shoulder portion and locked in position thereon by upsetting the end of the shoulder, substantially as shown in this view. This completes the construction of the device.

It is seen from this description that I have provided a very simple and inexpensive plunger operated locating device for jigs and fixtures which is convenient to operate. But while I have described and illustrated a preferred form of the invention, it is to be understood that modifications may be embodied therein within the scope of the claims hereto appended.

I claim:

1. A spring plunger comprising, a tubular body externally threaded throughout its length, there being an inwardly projecting shoulder in the passage through the body near the front end thereof, the portion of the passage in front of said shoulder being polygonal in cross-section, a plunger having a cylindrical head fitted to slide within the passage and a polygonal shank extending from the head thereof fittingly to ride in the polygonal portion of the passage, a plug seated within the body to close the rear end of the passage, and a compression spring between said plug and the head of the plunger normally maintaining the end of the polygonal shank projected beyond the end of the body.

2. A spring plunger comprising, a tubular body externally threaded throughout its length, there being an inwardly projecting shoulder in the passage through the body near the front end thereof, the portion of the passage in front of said shoulder being polygonal in cross-section, the rear end of the passage being internally threaded, a plunger having a cylindrical head fitted to slide within the passage and a polygonal shank extending from the head thereof fittingly to ride in the polygonal portion of the passage, an externally threaded plug seated in the threads of the passage to close the rear end of the passage, and a compression spring between said plug and the head of the plunger normally maintaining the end of the polygonal shank projected beyond the end of the body.

3. A spring plunger comprising, a tubular body externally threaded throughout its length, there being an inwardly projecting shoulder in the passage through the body near the front end thereof, the portion of the passage in front of said shoulder being polygonal in cross-section, a plunger consisting of a polygonal shank slidably extending through the polygonal portion of the passage, an annular head of a diameter fittingly to ride within the passage, the rear end of the shank being cut down to provide a stud projecting therefrom of a diameter tightly to seat in the annular head, the head being rigidly secured in position on the stud, a plug closing the rear end of the passage, and a compression spring between said plug and the head of the plunger normally maintaining the end of the polygonal shank projected beyond the end of the body.

4. A spring plunger comprising, a tubular body externally threaded throughout its length, there being an inwardly projecting shoulder in the passage through the body near the front end thereof, the portion of the passage in front of said shoulder being polygonal in cross-section, a plunger including a cylindrical head fitted to slide within the passage and a polygonal shank extending from the head thereof fittingly to ride in the polygonal portion of the passage, the front end of the shank being well rounded, a plug closing the rear end of the passage, the plug having a polygonal recess in the rear end thereof, and a compression spring between said plug and the head of the plunger normally maintaining the end of the polygonal shank projected beyond the end of the body.

5. A spring plunger comprising, a tubular body externally threaded throughout its length, there being an inwardly projecting shoulder in the passage through the body near the front end thereof, the portion of the passage in front of said shoulder being polygonal in cross-section, a plunger consisting of an annular head fitted to slide within the passage and a polygonal shank slidably extending through the polygonal portion of the passage, the front end of the shank being well rounded, the rear end of the shank being cut down to provide a stud of a diameter tightly to seat in the annular head, the head being rigidly secured in position on the stud, a plug closing the rear end of the passage, the plug having a polygonal recess in the rear end thereof, and a compression spring between said plug and the head of the plunger normally maintaining the end of the polygonal shank projected beyond the end of the body.

References Cited in the file of this patent

UNITED STATES PATENTS

| | | |
|---|---|---|
| Re. 10,464 | Day | Apr. 1, 1884 |
| 579,277 | Lord et al. | Mar. 23, 1897 |
| 624,017 | Hampson | May 2, 1899 |
| 1,107,022 | Block | Aug. 11, 1914 |
| 1,560,252 | Eshelman et al. | Nov. 3, 1925 |
| 1,861,937 | Philips | June 7, 1932 |
| 2,221,101 | Lefkowitz | Nov. 12, 1940 |
| 2,297,715 | Nordstrom | Oct. 6, 1942 |
| 2,348,292 | Gross | May 9, 1944 |
| 2,532,815 | Kindsvatter | Dec. 5, 1950 |